US006842822B2

United States Patent
Snyder et al.

(10) Patent No.: US 6,842,822 B2
(45) Date of Patent: Jan. 11, 2005

(54) SYSTEM AND METHOD FOR CACHE EXTERNAL WRITING

(75) Inventors: Michael D. Snyder, Austin, TX (US); Magnus K. Bruce, Cedar Park, TX (US); Jamshed Jalal, Cedar Park, TX (US); Thomas A. Hoy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 295 days.

(21) Appl. No.: 10/117,610

(22) Filed: Apr. 5, 2002

(65) Prior Publication Data

US 2003/0191902 A1 Oct. 9, 2003

(51) Int. Cl.[7] .............................................. G06F 12/00
(52) U.S. Cl. ...................... 711/118; 711/141; 711/142; 711/143; 711/144; 711/145
(58) Field of Search ......................... 711/118, 141–145

(56) References Cited

U.S. PATENT DOCUMENTS

| | | | |
|---|---|---|---|
| 4,737,909 A | * | 4/1988 | Harada ........................... 711/3 |
| 5,333,296 A | | 7/1994 | Bouchard et al. |
| 5,572,702 A | | 11/1996 | Sarangdhar et al. |
| 5,623,628 A | | 4/1997 | Brayton et al. |
| 5,737,756 A | * | 4/1998 | White et al. ................. 711/142 |
| 5,860,092 A | * | 1/1999 | Breid et al. .................. 711/118 |
| 5,860,133 A | | 1/1999 | Beaverson et al. |
| 5,893,141 A | | 4/1999 | Kulkarni |
| 5,950,227 A | | 9/1999 | Kulkarni |
| 6,021,473 A | * | 2/2000 | Davis et al. ................. 711/141 |

OTHER PUBLICATIONS

Brian K. Bray et al., "Writes Caches As An Alternative To Write Buffers", Technical Report No. CSL–TR–91–470, Apr. 1991, supported by NASA under NAG2–248 using facilities supplied under NAG@ 419, 20 pgs.

* cited by examiner

*Primary Examiner*—T Nguyen
(74) *Attorney, Agent, or Firm*—Rober L. King

(57) ABSTRACT

A system (10) uses shared resources (44, 54) to perform conventional load/store operations, to preload custom data from external sources, and to efficiently manage error handling in a cache (42, 52, 48). A reload buffer (44, 54) is used in conjunction with a cache (42, 52) operating in a write-through mode to permit lower level memory in the system to operate in a more efficient write-back mode. A control signal (70) selectively enables the pushing of data into the cache (42, 52, 48) from an external source. The control signal utilizes one or more attribute fields that provide functional information and define memory characteristics.

20 Claims, 3 Drawing Sheets

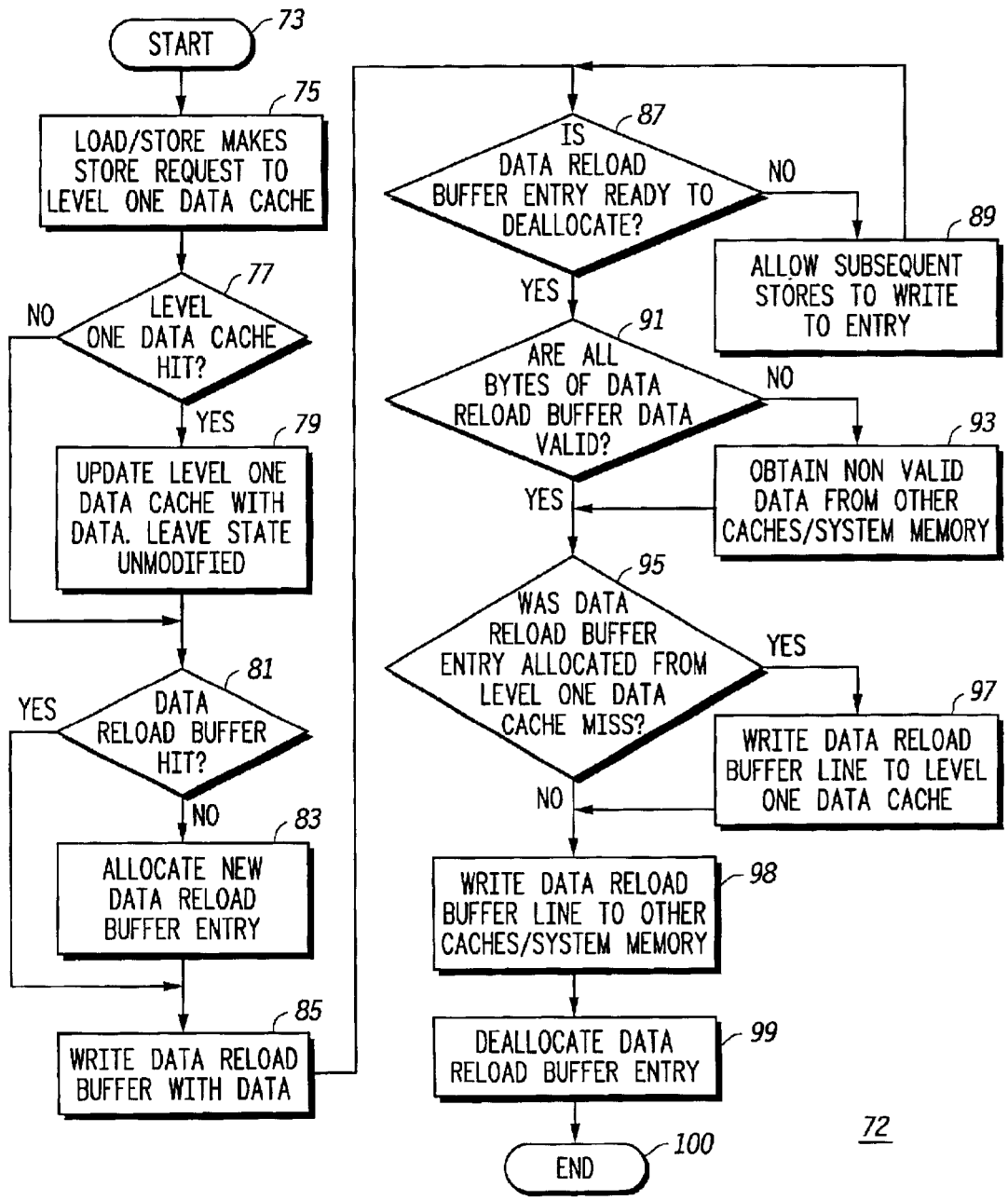

SYSTEM AND METHOD FOR CACHE EXTERNAL WRITING

FIELD OF THE INVENTION

This invention relates generally to data processors, and more specifically, to cache memories that support data processing operations.

BACKGROUND OF THE INVENTION

Data processors commonly implement one or more levels of cache memory for temporary storage of information. Caches are used to bring data closer to the processing element and reduce data access time. Many techniques exist to efficiently manage cache memory systems. In high performance reliable systems, two techniques necessary for efficiently managing cache memory systems are the ability to preload custom data into the cache and the ability to detect and correct bit errors.

Users of data processing systems frequently desire to reduce latency to memory by preloading a cache with proprietary application-specific data. The common techniques involve the processor executing the steps required to bring data into its cache by using either software or hardware. The software technique for preloading caches involves inserting specific instructions in the program flow being executed in the data processing system. The hardware technique involves adding hardware to analyze the access pattern and dynamically prefetch code and data that is considered likely to be accessed. These techniques are generally limited to the processor executing steps required to bring data into its cache and do not permit an external agent to preload data into a processor cache.

Cache memory systems implement error detection to discover and potentially correct bit errors in the stored information. Two commonly used error detection techniques are the parity bit error detection method and the more complex error correcting (ECC) method. Due to speed requirements, modern data processors generally only implement a simple error detection technique in their level one cache. ECC is more commonly implemented in level two memories than in level one memories.

The parity bit method is simpler to implement, but has less functionality than the ECC method. For example, the parity bit method is capable of only detecting single bit errors while the ECC method is capable of both detecting and correcting single bit errors. Additionally, the ECC method may detect multiple bit errors.

Recovering from a parity bit error in a level one cache involves invalidating the level one cache. Some caches support invalidation of single storage lines while others require a complete erasure or flushing of all entries in the cache. Either invalidation method requires that the level one cache treat all stores (i.e. writes) as a write-through process in which both the cache and a system memory are updated. A downside of this technique is increased traffic to the lower levels of the memory hierarchy that results in overall slower system performance.

For the ECC methods, system performance is degraded due to several reasons. Initially, an ECC code must be generated and this code generation takes time and additional system resources. Storage must be provided for the ECC code in the level one cache. When data is read, the ECC is calculated again and compared with the stored ECC code. When the number of bits that are written to the level one cache is smaller than the size of the data that is used to generate the ECC code, a read/modify/write process involving the level one cache is required to calculate the ECC code. Therefore, while this process is occurring, the level one cache is not available for other processing functions. A need exists for a more efficient data processing system that implements error handling.

BRIEF DESCRIPTION OF THE DRAWINGS

The present invention is illustrated by way of example and not limitation in the accompanying figures, in which like references indicate similar elements.

FIG. 4 illustrates in bit format form a communicated control signal communicated via the system interconnect in the system of FIG. 1; and FIG. 5 illustrates in flowchart form a store (i.e. a write) operation using both a data cache and a reload buffer in accordance with the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
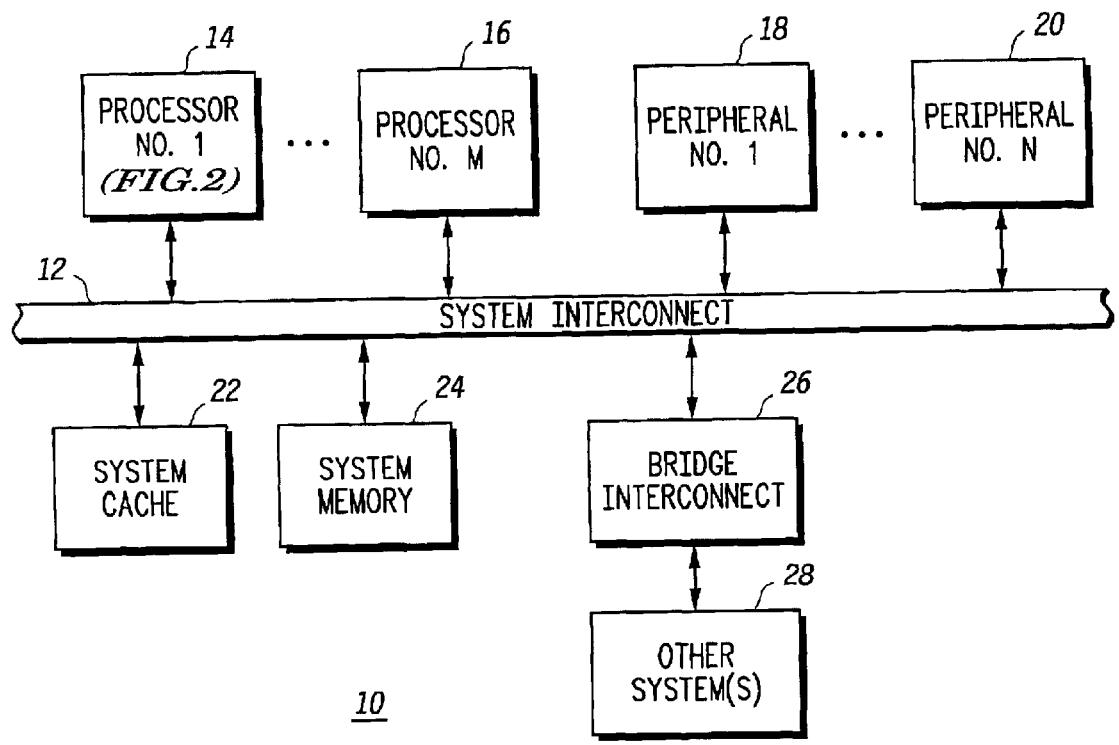
FIG. 1 illustrates in block diagram form a data processing system having a plurality of elements for communication via an interconnect.

Illustrated in FIG. 1 is a data processing system 10 generally having a plurality of M processors and N peripherals, where M and N are positive integers. In the illustrated form, a first processor 14 is coupled to a system interconnect 12. It should be appreciated that system interconnect 12 may be implemented in various forms. For example, system interconnect 12 may implement different communication protocols and therefore be a system bus, direct wires, logic circuitry or a combination of the above. Additionally, the system interconnect may be a wireless or optical medium in which the information is communicated without the continual use of physical conductors. There are multiple devices coupled to the system interconnect 12 that are operative, among other functions, to modify storage locations. An Mth processor 16, a first peripheral 18 and an Nth peripheral 20 are also coupled to the system interconnect 12. A system cache 22 and a system memory 24 are further coupled to system interconnect 12. Additionally, a bridge interconnect 26 is coupled to system interconnect 12 and other system(s) 28 are coupled to the bridge interconnect 26.

In operation, it should be well understood that system 10 is illustrative and variations of the structure illustrated may be readily created. Processors 14 and 16 are independently operating processors and both share the system memory 24 and the system cache 22. Although each of processors 14 and 16 have their own cache memory subsystem, a system cache 22 may add additional cache features to the system. Peripherals 18 and 20 may be implemented as any of various known peripherals, such as a Direct Memory Access (DMA) controller, a graphics controller, a security processor, a keyboard or a portable communication device. The bridge interconnect 26 functions to connect one or more other systems 28 to the system interconnect 12. The one or more other systems 28 may follow the same or different protocols than that of system interconnect 12. A commonly desired operation within system 10 is to transfer information (address, control and data) between the peripherals and the processors. For example, it may be desired to transfer information from peripheral 18 to processor 14 to be written to the memory subsystem of processor 14. The memory subsystem of processor 14 contains a cache memory coupled to the system interconnect 12 that has a unique identifier and is operative to contain data corresponding to locations in system memory 24. When information is not contained in the memory subsystem of any of the processors or peripherals, a common source for the information is from system memory 24. To keep the information that is used within system 10 consistent between the system memory, system cache 22 and the memory subsystems of the processors, one of numerous known memory coherency schemes may be used.

Figure 2:
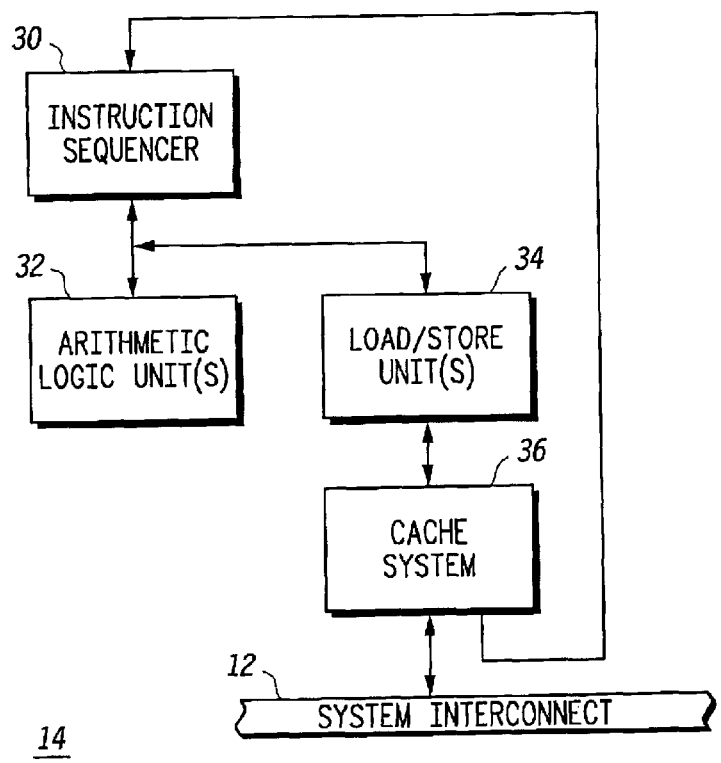
FIG. 2 illustrates in block diagram form a detail of one form of one of the processors of FIG. 1.

Illustrated in FIG. 2 is an example of processor 14 of FIG. 1. An instruction sequencer 30 has a first input, an output and a second input. The output of instruction sequencer 30 is connected to an input of one or more arithmetic logic unit(s) 32. Each of the one or more arithmetic logic unit(s) 32 has an output connected to the second input of the instruction sequencer 30. The output of instruction sequencer 30 is also connected to an input of one or more load/store unit(s) 34. Each of the one or more load store unit(s) 34 has a first output connected to the second input of the instruction sequencer 30. A second output of load/store unit(s) 34 is connected to a first input of a cache system 36. A first output of cache system 36 is connected to the first input of instruction sequencer 30 and a second output of cache system 36 is connected to the system interconnect 12. A third output of cache system 36 is connected to a second input of the load/store unit(s) 34.

In operation, the instruction sequencer 30 sequences instructions obtained from the cache system 36 and dispatches those instructions to arithmetic logic unit(s) 32 and load/store unit(s) 34. ALU-specific instructions are executed by the arithmetic logic unit(s) 32 and load/store-specific instructions are executed by the load/store unit(s) 34. The cache system 36 functions to support each of the load/store unit(s) 34 and the sequencer 30 to maintain the pipeline with information. Cache system 36 directly interfaces with the system interconnect 12 to receive and provide information via system interconnect 12.

Figure 3:
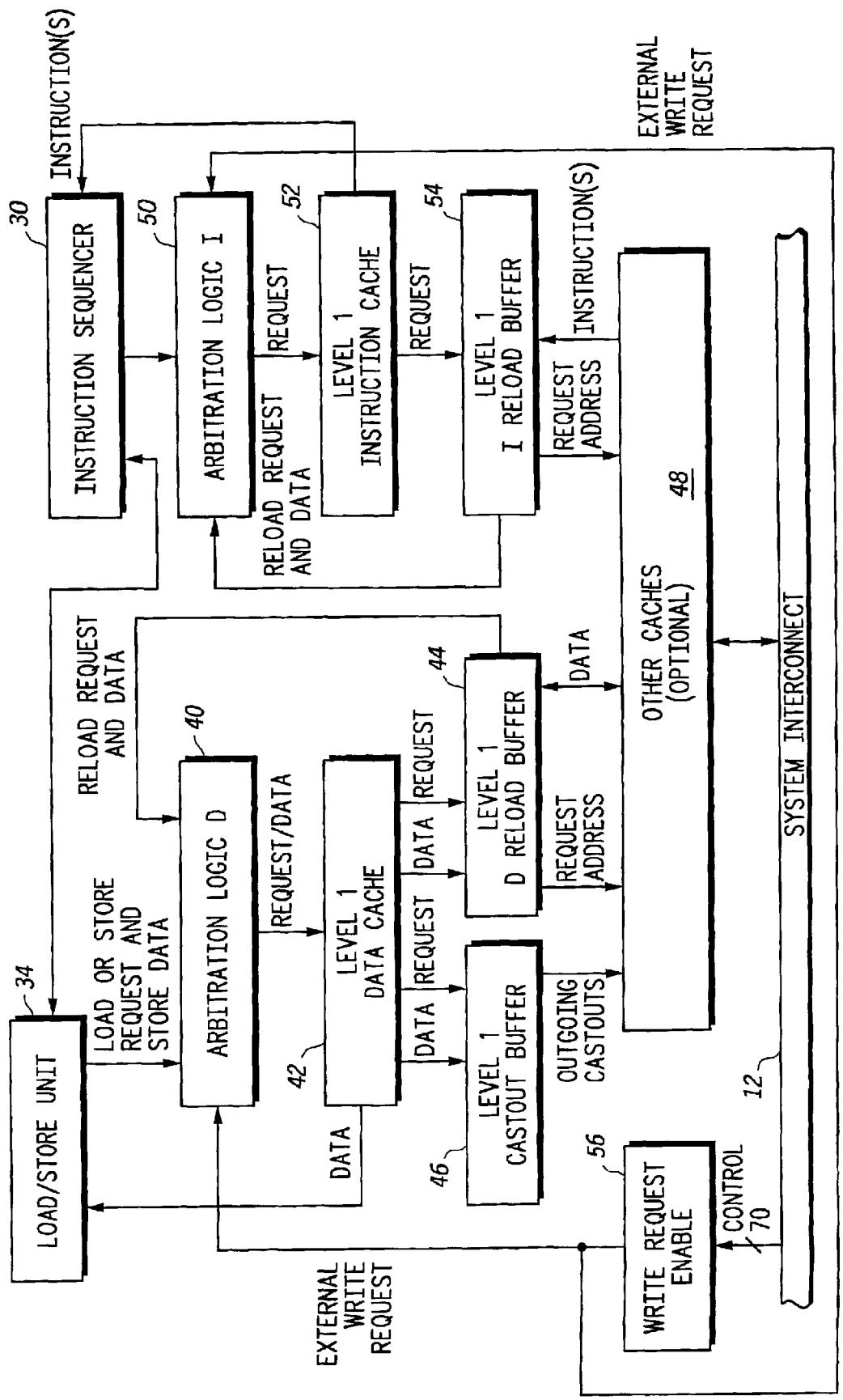
FIG. 3 illustrates in block diagram form further detail of a portion of the processor of FIG. 2.

Illustrated in FIG. 3 is a portion of the cache system 36 of FIG. 2. For convenience of illustration, the same reference numbers for elements common to FIGS. 1, 2 and 3 will be used. One of the load/store unit(s) 34 has a first output connected to arbitration logic for data 40. The output is a signal that represents a request to load (i.e. read) or store (write) data. If the request is to store data, the data will also be present. A second output of load/store unit 34 is connected to a first input of instruction sequencer 30. An output of the arbitration logic for data 40 is connected to an input of a Level 1 data cache 42. The output of arbitration logic for data 40 includes a request to access the cache. In addition, if the request is to store data, the data will also be present. A first data output of the Level 1 data cache 42 is connected to an input of the load/store unit 34. A second data output of the level 1 data cache 42 is connected to a first input of the Level 1 castout buffer 46. A first request output of the Level 1 data cache 42 is connected to a second input of the Level 1 castout buffer 46. A third data output of the Level 1 data cache 42 is connected to the first input of the Level 1 data (D) reload buffer 44. A second request output of the Level 1 data cache 42 is connected to a second input of the Level 1 D reload buffer 44. An output of the Level 1 castout buffer 46 is connected to optional other caches 48 to provide outgoing castouts that are both requests and data. A first output of the Level 1 D reload buffer 44 is connected to a second input of other caches 48 to provide a request address. A second output of the Level 1 D reload buffer 44 is connected to a third input of the optional other caches 48 to provide data. A first output of the optional other caches 48 is connected to a third input of the Level 1 D reload buffer 44. A third output of the Level 1 D reload buffer 44 is connected to a second input of arbitration logic D 40 to provide a reload request with data.

The instruction sequencer 30 has a first output connected to a first input of instruction arbitration logic (I). An output of instruction arbitration logic I 50 is connected to an input of a Level 1 Instruction cache 52 to provide a request. A first output of the Level 1 Instruction cache 52 is connected to a first input of a Level 1 Instruction (I) reload buffer 54 to provide a request. A second output of the Level 1 Instruction cache 52 is connected to a second input of instruction sequencer 30 to provide one or more instruction(s). A first output of the Level 1 I reload buffer 54 is connected to a second input of the arbitration logic I 50 to provide a reload request and data. A second output of the Level 1 I reload buffer 54 is connected to a fourth input of the optional other caches 48 to provide a request address. A second output of the optional other caches 48 is connected to a second input of the Level 1 I reload buffer 54 to provide one or more instructions. A third output of the optional other caches 48 is connected to the system interconnect 12 and the system interconnect is connected to a fifth input of the optional other caches 48.

A write request enable logic 56 has an input connected to the system interconnect 12 to receive a control signal 70. An output of write request enable logic 56 is connected to both a third input of arbitration logic D 40 and to a third input of arbitration logic I 50 to provide an external write request.

In operation, the illustrated portion of processor 14 may function to receive write requests from an external source connected to system interconnect 12 and efficiently process the write request. Additionally, the illustrated portion of processor 14 may function to implement load (read) and store (write) operations in response to demand requests from load/store unit 34. Each of these two functions will now be described in detail.

Assume a control signal 70 is provided by one of the other M processors or any of the N peripherals or the bridge interconnect 26. The control signal 70 is received by the write request enable logic 56 via the system interconnect 12. The control signal 70 has a format as illustrated in FIG. 4. Control signal 70 has a plurality of fields. A first field contains system address information. This is a physical address that uniquely identifies data in system 10. A second field contains one or more unique identifier(s) or cache target identifier(s) that specify the specific destination cache(s) where the write should be made. The at least one unique identifier may be operative to simultaneously identify unique sets of cache memories that are targets of an external write operation. A third field contains one or more cache target attribute(s). Possible cache target attributes include, but are not limited to, attributes that indicate the state of the cache memory. Such attributes include the cache's coherency state or the relative state of the cache line, such as whether the cache line is locked or unlocked. Yet other attributes may indicate a state of a cache memory entry relative to other cache memory entries, the replacement algorithm that is used, such as a least recently used algorithm, and priority levels, such as the priority of the external write request. It should be well understood that the form of control signal 70 in FIG. 4 is exemplary only. For example, as an alternative control signal 70 may be implemented as a unique signal, such as an analog or a digital signal.

The write request enable logic 56 processes control signal 70 to determine the destination cache(s) and cache target attributes. The write request enable logic 56 operates to detect a communication signal according to a unique identifier consisting of the cache target and the one or more attribute(s) in the communication or control signal. The write request enable logic 56 schedules a query or look-up of all cache levels to determine if the address associated with the requested write is valid in any cache. In one form, if the requested write address is valid and modified in the level 1 data cache 42 or the optional other caches 48, then the data is pushed from that cache location to system interconnect 12 pursuant to a conventional coherency operation. If the requested write address is valid and unmodified in the level 1 data cache 42 or the optional other caches 48, or the requested write address is valid in the level 1 instruction cache 52, then the data in that cache location is invalidated. Therefore, at this point, the line associated with the relevant write address is no longer valid in any cache. In another form, the cache location associated with the requested write is not invalidated and coherency logic (not shown) is responsible for maintaining coherency between the cache location and data reload buffer 44 and instruction reload buffer 54 to be described below. In that form, modified data is not pushed to system interconnect 12 and the merging of the requested write happens internally in the data reload buffer 44 or instruction reload buffer 54. It should however be appreciated that the merging of the request write may also be implemented elsewhere, such as within the level 1 data cache 42, the level 1 instruction cache 52 or the optional other caches 48.

The combination of destination caches indicated by the attributes in control signal 70 determines the next steps. If the write request targets the level 1 data cache 42, the write request enable logic 56 directs the level 1 data reload buffer 44 to allocate an entry and store the write data from system interconnect 12. If the write contains less than a cache line of data, the level 1 data reload buffer 44 schedules a request for the remaining fill data from the optional other caches 48 or system memory 24. When all the reload data is available, the write request enable logic 56 then generates an external write request signal to the data arbitration logic 40 to reload the level 1 data cache 42 from the level 1 data reload buffer 44.

If the write request targets optional other caches 48, the write request enable logic 56 directs the level 1 data reload buffer 44 to allocate an entry and store the write data from system interconnect 12. If the write contains less than a cache line of data, the level 1 data reload buffer 44 schedules a request for the remaining fill data from the optional other caches 48 or system memory 24. When all the reload data is available, the write request enable logic 56 then generates an external write request signal to reload the optional other caches 48 from the level 1 data reload buffer 44.

If the write request targets the level 1 instruction cache 52, the write request enable logic 56 directs the level 1 instruction reload buffer 54 to allocate an entry and store the write data from system interconnect 12. If the write contains less than a cache line of data, the level 1 instruction reload buffer 54 schedules a request for the remaining fill data from the optional other caches 48 or system memory 24. When all the reload data is available, the write request enable logic 56 then generates an external write request signal to the instruction arbitration logic 50 to reload the level 1 instruction cache 52 from the level 1 instruction reload buffer 54.

Illustrated in FIG. 5 is a process 72 that illustrates one form of the store (write) operation performed in response to demand requests from load/store unit 34. The instruction sequencer 30 of processor 14 functions to fetch instructions. The load/store unit 34 reads and writes data to and from cache system 36 according to the fetched instructions. Within a variety of fetched instructions there are both load (read) instructions and store (write) instructions. Loads (reads) are not incorporated into the write shadowing functionality described herein and therefore will not be discussed in detail. Data cache 42 within cache system 36 has at least one block of memory storage having a predetermined block size. The data reload buffer 44 has a predefined block size and is operative to fetch blocks of data for allocation into data cache 42. As will be described below, a write shadowing operation by the data reload buffer 44 is performed of the level 1 data cache 42 so that the level 1 data cache 42 may be operating as if it were in a write through mode. Data cache 42 is operative to allocate an entry in data reload buffer 44 for both store (write) instruction hits and misses in data cache 42. A "hit" is a conventional memory term indicating that an addressed location is present and valid in a storage device, and a "miss" indicates that an address location is not valid for the storage device. In a step 73, the demand load/store operation starts. In a step 75, the load/store unit 34 makes a store (write) request to arbitration logic D 40 to access the level 1 data cache 42. In a step 77 a determination is made as to whether or not the address hit in the level 1 data cache 42. If there is a hit, in a step 59, the level 1 data cache 42 is updated with data. The state of the relevant cache line in the level 1 data cache 42 is left unmodified because it is operating as if it were in a write through mode. At the conclusion of step 79 or if there is not a hit, a step 81 is performed next. A determination is made in step 81 whether or not the address hit in the level 1 data reload buffer 44. If there is not a hit, in a step 83 a new level 1 data reload buffer 44 entry is allocated. In one form, the allocation of a new entry upon a miss is performed by comparing the block associated with the store request with at least one pre-existing block in the data cache reload buffer 44 and allocating a new entry in the data cache reload buffer when no match exists. At the conclusion of step 83 or if there is not a hit, a step 85 is performed next. In step 85, the level 1 data reload buffer 44 entry is written with data from the store request (e.g. a store instruction). In a step 87, a determination is made as to whether the level 1 data reload buffer 44 entry must be deallocated (i.e. evicted). Causes of deallocation include, among others, running out of system resources or reaching a specified time interval. If the entry is not ready to be deallocated, a step 89 is executed in which subsequent stores (writes) are allowed to be written to the entry. Step 89 returns to step 87 and continues until the level 1 data reload buffer 44 entry is ready to be deallocated. When the entry is ready to be deallocated, a step 91 determines whether all of the bytes of data in the level 1 data reload buffer 44 entry are valid. If all the bytes are not valid, in a step 93 remaining fill data is obtained from the optional other caches 48, from other sources via system interconnect 12. When all the bytes are valid, in a step 95 a determination is made if the data reload buffer 44 entry was allocated from a level 1 data cache miss. If the entry was allocated from a level 1 data cache 42 miss, in a step 97 the level 1 data reload buffer 44 entry data is written to the level 1 data cache 42. At the conclusion of step 97 or if the level 1 data reload buffer 44 entry was not allocated from a level 1 data cache 42 miss, then in a step 98 the level one data reload buffer 44 entry data is written to optional other caches 48 or system memory 24. In one form, the data in a block of memory in the data cache 42 is inspected to determine if all bytes in the block have been written by store requests, and if so, then directly writing the block of data in the data cache reload buffer 44 to the optional other caches and system memory 24 without filling the data cache reload buffer 44 first. In a step 99, the level one data reload buffer 44 entry is deallocated. The process concludes in a step 100.

By now it should be appreciated that there has been provided circuitry and a method for performing efficient cache memory management in a processing system. In particular, common resources can be leveraged to: (1) support conventional load/store operations; (2) allow data to be pushed into embedded caches from an arbitrary external source; and (3) enable the level 1 caches to function in a write-through mode while allowing the lower level memory to function in an efficient write-back mode. Further, external write requests are facilitated by using a control signal that has one or more attributes that are separate and independent from addressing information to be able to identify a target cache and specify attributes of the cache line.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific embodiments. However, one of ordinary skill in the art appreciates that various modifications and changes can be made without departing from the scope of the present invention as set forth in the claims below. For example, the processing system may be implemented with any of various semiconductor memories. The system provided herein may be implemented either as a system on a chip (SOC) or as discrete components. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for cache external writing, having a system interconnect for communication among multiple devices coupled to the system interconnect, the devices operative to modify storage locations, comprising:

a system memory coupled to the system interconnect;

a cache memory coupled to the system interconnect, the cache memory having a unique identifier and operative to contain data corresponding to locations in the system memory;

write enable logic coupled to the system interconnect, the write enable logic operative to detect a communication signal according to the unique identifier; and a communication signal generated by one of the multiple devices connected to the system interconnect and received by the write enable logic, the communication signal operative to communicate to the cache memory when writes to the system memory should be written to the cache memory, the communication signal containing at least one attribute, the at least one attribute indicating a characteristic of the cache memory.

2. The system for cache external writing defined in claim 1, wherein the at least one attribute of the communication signal indicates a memory replacement algorithm to be used.

3. The system for cache external writing defined in claim 2, wherein the at least one attribute is operative to simultaneously identify unique sets of cache memories.

4. The system for cache external writing defined in claim 1, wherein the at least one attribute indicates the state of the cache memory.

5. The system for cache external writing defined in claim 1, wherein the at least one attribute indicates a coherency state of the cache memory.

6. The system for cache external writing defined in claim 1, wherein the at least one attribute indicates a state of a cache memory entry relative to other cache memory entries.

7. The system for cache external writing defined in claim 1, wherein the at least one attribute indicates a priority level.

8. The system for cache external writing defined in claim 1, wherein the communication signal comprises a unique signal.

9. A method for cache external writing among multiple devices coupled to a system interconnect, the devices operative to modify storage locations, comprising:

providing a system memory coupled to the system interconnect;

providing a cache memory coupled to the system interconnect, the cache memory having a unique identifier and operative to contain data corresponding to locations in the system memory; and transmitting a communication signal from one of the multiple devices connected to the system interconnect, the communication signal communicating to the cache memory when writes to the system memory should be written to the cache memory and containing at least one attribute that indicates a characteristic of the cache memory.

10. The method defined in claim 9, further comprising using the at least one attribute to indicate a memory replacement algorithm to be used.

11. The method defined in claim 9, further comprising the step of providing write enable logic coupled to the system interconnect, the write enable logic operative to detect the communication signal.

12. The method defined in claim 9, wherein the at least one attribute of the communication signal indicates a memory replacement algorithm to be used.

13. The method defined in claim 12, wherein the at least one attribute of the communication signal simultaneously identifies unique sets of cache memories.

14. The method defined in claim 9, further comprising indicating a state of the cache memory with the at least one attribute of the communication signal.

15. The method defined in claim 14, wherein indicating the state of the cache memory with the at least one attribute of the communication signal further comprises indicating the coherency state of the cache memory.

16. The method defined in claim 15, wherein indicating the state of the cache memory further comprises indicating a state of a cache memory entry relative to other cache memory entries.

17. The method defined in claim 9, further comprising indicating a priority level with the at least one attribute.

18. The method defined in claim 9, wherein transmitting the communication signal further comprises providing the communication signal as a unique signal.

19. A system for cache external writing, having a system interconnect for communication among multiple devices coupled to the system interconnect, the devices operative to modify storage locations, comprising:

a system memory coupled to the system interconnect:

a cache memory coupled to the system interconnect, the cache memory having a unique identifier and operative to contain data corresponding to locations in the system memory;

write enable logic coupled to the system interconnect, the write enable logic operative to detect a communication signal according to the unique identifier; and a communication signal generated by one of the multiple devices connected to the system interconnect and received by the write enable logic, the communication signal indicating a state of the cache memory.

20. A method for cache external writing among multiple devices coupled to a system interconnect, the devices operative to modify storage locations, comprising:

providing a system memory coupled to the system interconnect;

providing a cache memory coupled to the system interconnect, the cache memory having a unique identifier and operative to contain data corresponding to locations in the system memory; and transmitting a communication signal to cache memory write enable logic from one of the multiple devices connected to the system interconnect, the communication signal containing at least one attribute that indicates a state of the cache memory.

* * * * *